J. H. FISHER.
Torpedo-Guard.

No. 197,262. Patented Nov. 20, 1877.

WITNESSES:
Alex F. Roberts
James M. Henley

INVENTOR:
J. H. Fisher
BY Munn&Co
ATTORNEYS.

UNITED STATES PATENT OFFICE.

JOHN H. FISHER, OF MOUNT WASHINGTON, MARYLAND.

IMPROVEMENT IN TORPEDO-GUARDS.

Specification forming part of Letters Patent No. 197,262, dated November 20, 1877; application filed November 1, 1877.

*To all whom it may concern:*

Figure 1:
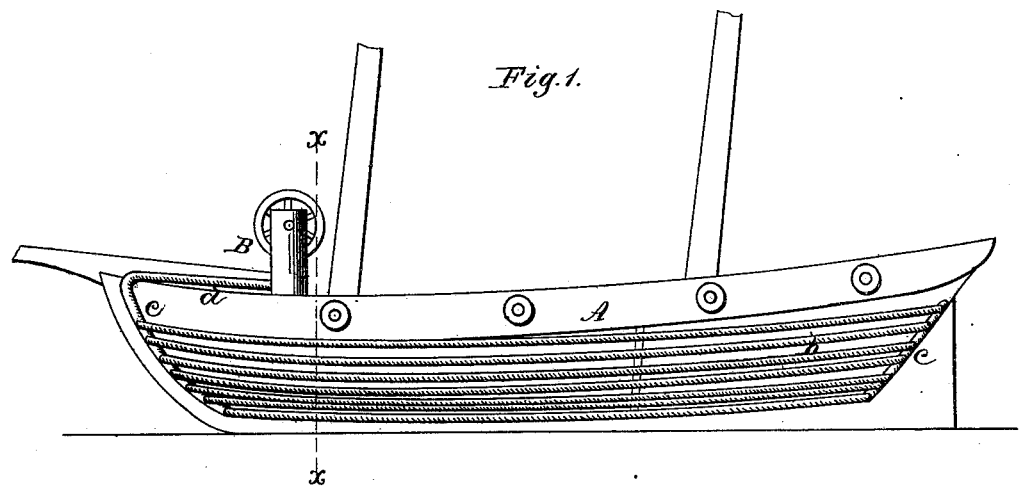
Figure 2:
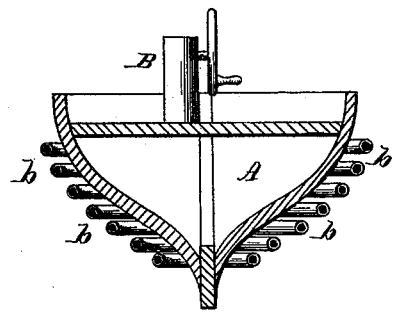

Be it known that I, JOHN HARMANNS FISHER, of Mount Washington, in the county of Baltimore and State of Maryland, have invented a new and Improved Device for Protecting Vessels against Torpedoes, of which the following is a specification:

Figure 1 is a side elevation of a vessel provided with my improved protector. Fig. 2 is a vertical transverse section taken on line $x\ x$ in Fig. 1.

Similar letters of reference indicate corresponding parts.

The object of my invention is to provide an efficient device for protecting the hulls of vessels against torpedoes.

The invention consists in a series of pipes, placed on each side of the hull of the vessel, a suitable distance therefrom, and connected together and with a forcing apparatus, for filling them with air or water, or both.

The invention is more especially designed for application to gun-boats or men-of-war, as a protection against submarine attacks; but it may be applied to other vessels to increase their buoyancy and their carrying capacity.

Referring to the drawings, A is the hull of a vessel, and $b\ b$, &c., are horizontal pipes, curved to conform to the shape of the hull, and placed a small distance apart and a short distance from the hull. The ends of the pipes are connected together by pipes $c$, to one of which, on each side of the vessel, a pipe, $d$, is connected, which is also connected with a pump, B, by which air or water may be forced into or removed from the pipes $b$.

The pipes $b$ may be made of rigid or flexible material, and may be placed at a greater or less distance from the hull of the vessel.

These pipes, by coming into contact with submerged torpedoes, cause them to explode at such a distance from the vessel as to be harmless to the hull.

By filling the pipes with air the carrying capacity of the vessel is increased. By filling them with water the vessel may be made to sit farther down in the water, so that less of its surface is exposed above the surface of the water.

It is obvious that the arrangement of the pipes may be varied without impairing the device as to protection; but the horizontal arrangement offers the least impediment to the propulsion of the vessel.

Having thus described my invention, I claim as new and desire to secure by Letters Patent—

A series of pipes arranged along the sides of the hull of a vessel, and connected with each other, as and for the purpose herein shown and described.

JOHN HARMANNS FISHER.

Witnesses:
 CHAS. WEHRHAM,
 W. H. JACKSON.